(12) United States Patent
Swinbanks et al.

(10) Patent No.: US 7,113,384 B2
(45) Date of Patent: Sep. 26, 2006

(54) DYNAMIC DEGAUSSING SYSTEM

(75) Inventors: Malcolm A. Swinbanks, Cambridge (GB); Christopher E. Ruckman, Alexandria, VA (US); John M. Holford, Oakton, VA (US)

(73) Assignee: VSSL Commercial, Inc., Alexandria, VA (US)

( * ) Notice: Subject to any disclaimer, the term of this patent is extended or adjusted under 35 U.S.C. 154(b) by 495 days.

(21) Appl. No.: 10/431,374

(22) Filed: May 8, 2003

(65) Prior Publication Data

US 2004/0042150 A1 Mar. 4, 2004

Related U.S. Application Data

(63) Continuation-in-part of application No. 10/291,789, filed on Nov. 12, 2002, now abandoned, and a continuation-in-part of application No. 09/754,245, filed on Jan. 5, 2001, which is a continuation of application No. 09/492,827, filed on Jan. 27, 2000, now Pat. No. 6,487,061.

(60) Provisional application No. 60/414,668, filed on Oct. 1, 2002.

(51) Int. Cl.
*H01H 47/00* (2006.01)
(52) U.S. Cl. ...................................... 361/143; 361/146
(58) Field of Classification Search ................. 361/143, 361/146
See application file for complete search history.

(56) References Cited

U.S. PATENT DOCUMENTS

| 4,373,174 A | 2/1983 | Akesson |
| 5,032,792 A | 7/1991 | Wing et al. |
| 5,039,911 A | 8/1991 | Buhler |
| 5,189,590 A | 2/1993 | Schneider |
| 5,463,313 A | 10/1995 | Berkcan |
| 5,463,523 A | 10/1995 | Holmes et al. |
| 5,483,410 A | 1/1996 | Holmes et al. |
| 5,986,355 A | 11/1999 | Rosen |
| 6,487,061 B1 * | 11/2002 | Swinbanks et al. ......... 361/143 |
| 6,734,353 B1 * | 5/2004 | Holmlund et al. ........ 174/35 R |
| 6,911,754 B1 * | 6/2005 | Johnson ..................... 310/90.5 |

* cited by examiner

*Primary Examiner*—Stephen W. Jackson
(74) *Attorney, Agent, or Firm*—Dickstein Shapiro Morin & Oshinsky LLP

(57) ABSTRACT

A dynamic degaussing system includes a magnetic field sensor for generating a sensor signal in response to a sensed magnetic field. The magnetic sensor is coupled to a controller that produces an output signal based on the sensor signal. The controller may include feedforward and feedback control loops. The output signal of the controller controls a magnetic field generator which generates a magnetic field so as to attenuate the sensed magnetic field. According to one aspect of the invention, a vessel is provided with a reduced magnetic signature and a control system for controlling magnetic fields about a podded electric motor. The control system employs feed-forward and feedback control in tandem. The control system may be dynamically adapted to changing physical characteristics of the motor. Control signals are generated in response to sensed or predicted magnetic fields internal to, or external to, the motor. The control inputs may be used to modify one or more motor driving currents, or to drive one or more magnetic field generators, so as to attenuate one or more magnetic field components generated by the motor.

34 Claims, 13 Drawing Sheets

DYNAMIC DEGAUSSING SYSTEM

CROSS-REFERENCE TO RELATED APPLICATIONS

This patent application is a Continuation-in-Part of U.S. Non-Provisional patent application Ser. No. 10/291,789, filed Nov. 12, 2002 now abandoned, which is a Continuation Application of U.S. Non-Provisional patent application ser. No. 09/492,827, filed Jan. 27, 2000 (issued as U.S. Pat. No. 6,487,061 on Nov. 26, 2002), entitled Electromagnetic Support System; and a Continuation-in-Part of U.S. Non-Provisional patent application Ser. No. 09/754,245, filed Jan. 5, 2001, entitled Electromagnetic Active Vibration Control System And Electromagnetic Actuator the disclosures of which are herewith incorporated in their entirety. Applicant claims the benefit of U.S. Provisional Patent Application No. 60/414,668, filed Oct. 1, 2002, entitled Electromagnetic Active Vibration Control System And Electromagnetic Actuator, the disclosure of which is herewith incorporated in its entirety.

BACKGROUND OF THE INVENTION

1. Field of the Invention

The present invention relates to a system and method for the attenuation or cancellation of undesirable magnetic fields. The present invention also relates to a dynamic degaussing system.

2. Discussion of the Related Art

Magnetic signature techniques are employed in asset location and triggering systems. Thus, the control of magnetic fields is an important consideration in detection avoidance. For example, it is known to use magnetic triggering in naval and land mines. Magnetic land mines are buried in roads and other likely transit points and adapted to detonate based on a detected magnetic signature of a vehicle within the effective range of the explosive device. In like fashion, magnetic naval mines are deployed in harbors and shipping lanes. The mines are equipped with magnetic sensing devices to trigger detonation in proximity to passing naval vessels.

In recognition of the threat posed by magnetic mines, it is known to provide a naval vessel with a degaussing system to mask its magnetic signature. Known ship degaussing systems include hull mounted degaussing coils for reducing static magnetic field signatures. Orthogonal sets of degaussing coil loops may be aligned in perpendicular planes and supplied with electric currents to reduce magnetic field components. It has also been suggested to orient degaussing coils in non-orthogonal planes. Reference to such a degaussing system, employing non-orthogonal coils, is found in U.S. Pat. No. 5,483,410, issued to Holmes et al.

Degaussing systems may be provided with automatic controls for varying current conducted through the degaussing coils in accordance with parameters which affect the vessel magnetic field signature, such as geographic heading, roll, pitch and yaw. See, for example, U.S. Pat. No. 4,373,174, to Akesson.

SUMMARY OF THE INVENTION

According to one aspect of the invention, a system is provided for controlling external magnetic fields in a variable state electrical system. The system employs one or more sensors for sensing control data and producing corresponding control signals. The system operates one or more magnetic field generators in response to the control signals. The magnetic field generators generate magnetic fields to attenuate the external magnetic fields.

The present invention is well-suited for controlling external magnetic fields produced by a dynamic system. According to this aspect of the invention, the magnetic fields produced by the dynamic system being degaussed change with system load, driving currents, mechanical dynamics, and other changing physical characteristics of the system. The invention may be used to control external magnetic fields produced by one or more sources. To achieve such desirable external magnetic field control, plural control strategies with dynamic control parameters may be employed in parallel.

According to one aspect of the invention, a digital controller uses information from sensors disposed within and around a shielded electrical system, along with previously measured characterization data, to compute required currents that will most fully attenuate external magnetic fields of the shielded system. The controller calculates a desired attenuating signal, more or less in real-time, and transmits it to a corresponding magnetic field generator. The magnetic field generator creates an attenuating magnetic field having a direction and magnitude adapted to attenuate, by destructive interference, the magnetic field emitted by the system being degaussed.

In a preferred embodiment, the attenuating magnetic field generators may be spaced apart from the conductors or other structures generating the dynamic and static fields. In this way, the equipment for obtaining external magnetic field control does not interfere with the equipment or material at the location where the magnetic field is being generated. Accordingly, while magnetic field strength in the immediate vicinity of the shielded equipment may be relatively high, the net field strength drops rapidly with distance from the shielded system.

According to another aspect of the invention, the magnetic field generator is an electromagnet coil that is fixedly attached to a structure of the shielded system. For example, where the shielded system includes a motor, a magnetic field generator may be rigidly affixed to the frame of the motor adjacent to stator coil windings.

According to a further aspect of the invention, a control system uses a magnetic flux sensor to sense the necessary input signal required to operate the magnetic field generator. By locating the flux sensor as an integral unit with the magnetic field generator, the signal wiring leading to and from the magnetic field generator may be integrated together, making the control system durable, robust, and easy to install. One consequence is a readily serviceable system. In an alternative embodiment of the invention, the flux sensor may be spaced apart from the magnetic field generator.

Known marine degaussing systems are designed to degauss a vessel on a macro scale, and are unable to target specific fields generated by a particular subsystem of the vessel. Moreover, known marine degaussing systems function in static or low frequency modes and are not adaptable to the attenuation of fields generated by electrical equipment rotating at high angular velocities. By contrast, a system constructed in accordance with the present invention, with real-time control, can generate the necessary fields, in a compact region of space, to substantially eliminate the external magnetic fields generated by rotating electrical machinery. The magnetic field generators may be deployed in clusters or distributed in groups to generate magnetic fields, as necessary.

The invention may also be used to inject control signals into electromagnetic systems for use in certain testing procedures. In addition, the invention may be used, if desired, to monitor and record magnetic field levels of motors during operation, and to log specific events such as transient electro-magnetic fields.

In one embodiment of the invention, the digital controller is programmed to employ both feedforward and feedback control strategies in tandem. According to this aspect of the invention, outputs from adaptive feed-forward and modal feedback control units are added together, and the control system is dynamically adapted to the changing physical characteristics of the magnetic environment. For example, the dynamic transfer function for the feed-forward unit and the gain for the feedback unit may be measured or calculated as functions of sensed physical parameters such as magnetic flux, rotor angular velocity, and rotor winding current. Accordingly, the transfer function of the shielded system may be dynamically modified to reflect time-varying feedback control gains. If desired, the control system may be used to attenuate low frequency and static fields as well as rapidly varying fields.

The magnetic field generators may be fully potted (i.e., encapsulated in a polymer material). The polymeric potting material may be used to seal and protect the generators against degradation due to saltwater, oil, dust, and other contaminants.

According to one aspect of the invention, sensors provide data to the controller. The sensors sense the relative magnetic flux produced by the motor. Other sensors may also sense the current flowing in the various windings of the motor, including rotor windings and stator windings. The sensors may also sense the angular position or velocity of various motor components, and the angular acceleration of those components. In addition, the sensors may be used, if desired, to sense motor temperature and other environmental conditions.

These and other advantages and features of the invention will be more clearly understood from the following detailed description of the invention which is provided in connection with the accompanying drawings.

DETAILED DESCRIPTION OF PREFERRED EMBODIMENTS

Figure 1:
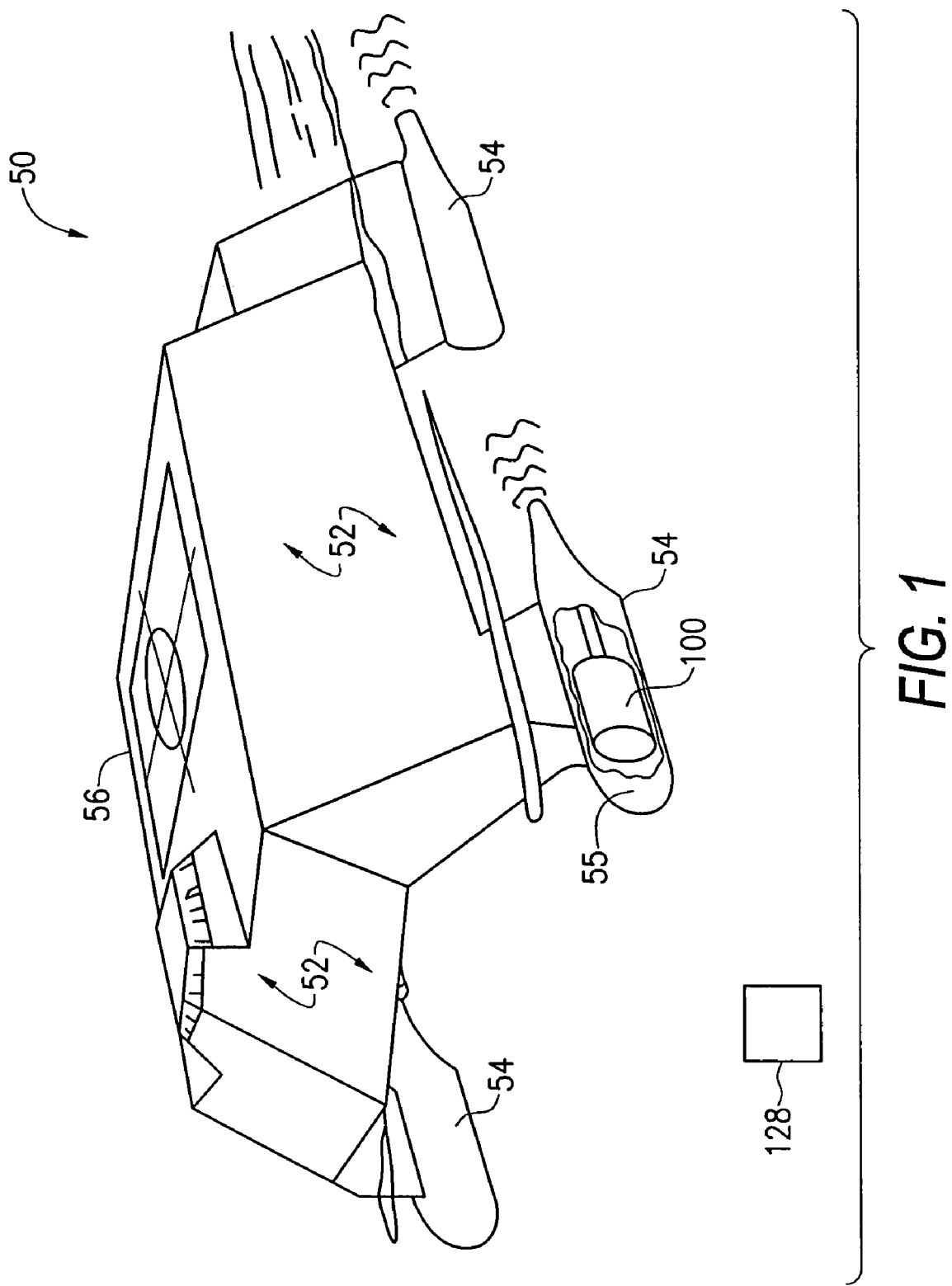
FIG. 1 is a perspective view of an electric-powered marine vessel constructed in accordance with one embodiment of the invention and a device including a magnetic detector.

Referring now to the drawings, where like reference numerals represent like elements, there is shown an electrically propelled naval vessel 50 constructed in accordance with a preferred embodiment of the present invention. The vessel 50 has large area planar angled surfaces 52 adapted to present a limited radar cross-section, and a small underwater hull area for minimal hydraulic drag. One aspect of the reduced underwater hull area is embodied in the use of podded electric drive motors 100. An exemplary podded motor is shown in a cutaway view of one pod 54 of vessel 50. The podded motors 100 are mounted in streamlined pods 54 external to the main superstructure 56 of the vehicle 50.

Podding of motors provides the advantages of allowing the above-mentioned stealthy hull designs, and high speed in naval architectures such as hydrofoils. Motor podding offers additional advantages, such as the potential for modular, and therefore rapid, propulsion systems repair and replacement. Thermal management is also improved by the placement of ship motors in pods external to the main superstructure.

The motors 100 tend to receive high electric currents, and they generate high strength magnetic fields within enclosures 55 that offer relatively little magnetic shielding. Moreover, the electric currents and related magnetic fields of the podded electric motors are dynamic, varying at frequencies related to the number of electromagnetic poles and the rotation speed of the motor. Furthermore, depending on the particular characteristics of the motors, the generated fields may be substantially asymmetric in space, which asymmetry may vary over time. Conventional degaussing techniques and systems are not effective to attenuate dynamic asymmetric high-strength magnetic fields such as those generated by, for example, podded electric motors. Accordingly, a vessel 50 employing podded motors 54 may be more vulnerable to detection by a hostile magnetic detector 128, such as the triggering detector of a magnetic mine.

Figure 2:
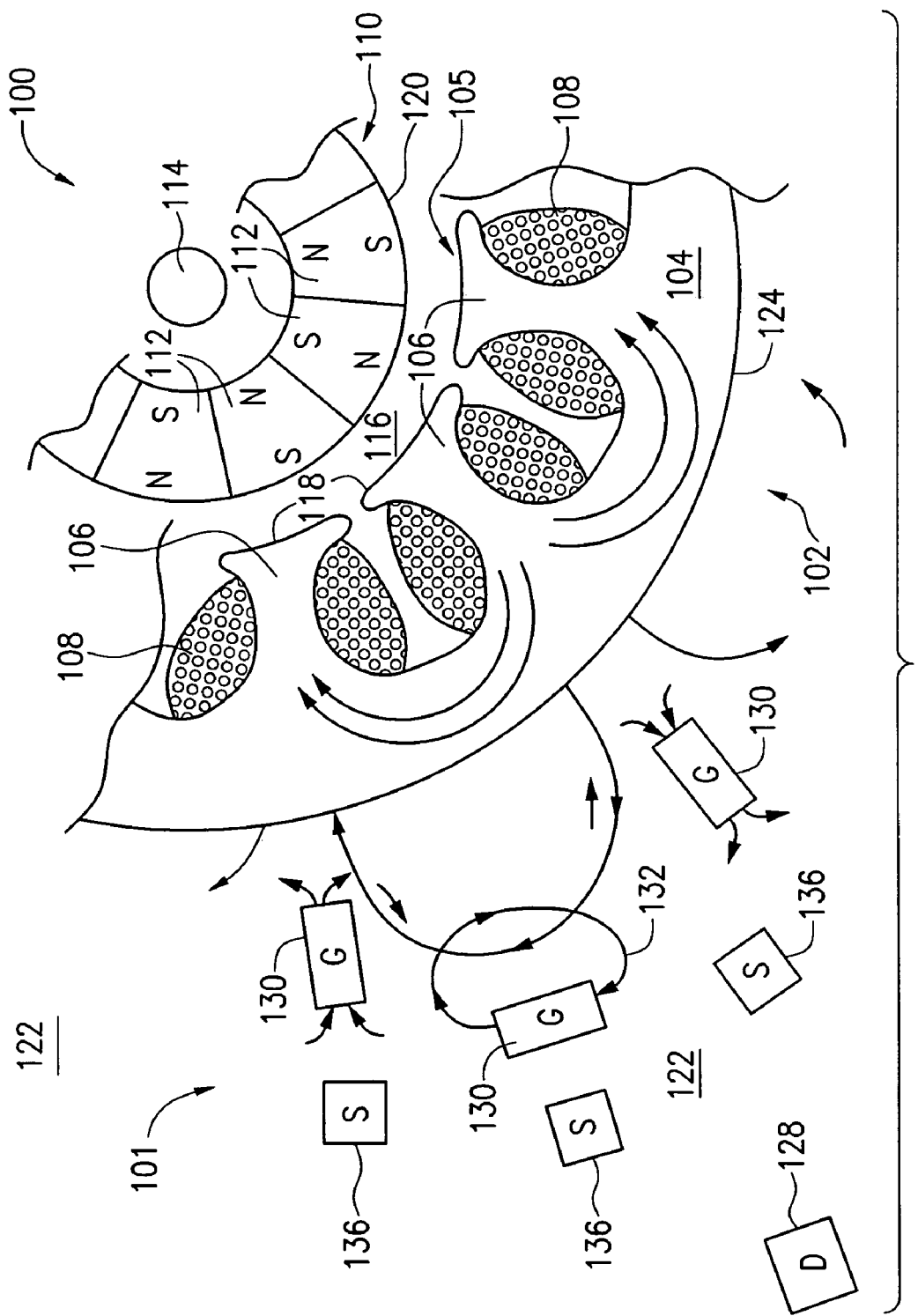
FIG. 2 is a cut-away view of a portion of the vessel of FIG. 1 in proximity to a magnetic detector, showing components of an electric motor.

FIG. 2 shows a portion of one of the podded electric motors 100. As shown, the motor 100 is equipped with a dynamic degaussing system 101. The motor 100 has a stator portion 102 including a stator iron portion 104 and a plurality of stator poles 105 with respective stator pole irons 106 and a stator pole windings 108. The motor 100 also includes a rotor portion 110 having a plurality of permanent magnet rotor poles 112 each disposed radially about an axial shaft 114. The rotor portion 110 has an outer circumferential surface 120 including a plurality of respective outer circumferential surfaces of the permanent magnet rotor poles 112. An air gap 116 separates respective inner circumferential surfaces 118 of the stator pole irons 106 from the outer circumferential surface 120.

During operation of the motor 100, a plurality of time-varying electric currents are applied to the respective stator windings 108 so as to induce respective magnetic fields within the air gap 116. Each of the magnetic fields encompasses a plurality of lines of magnetic flux. The lines of magnetic flux have respective magnitudes and orientations related to the intensity of current in the stator pole windings 108, and related to the physical configuration of the stator iron and stator windings, among other factors. Simultaneously, magnetic flux generated by the permanent magnet rotor poles 112 also occupies the air gap region 116. The opposing interaction of the magnetic flux generated by the stator poles 105 and that generated by the rotor poles 112 motivates the rotor 110 to rotate the axial shaft 114.

At the same time that the stator poles 106 generate magnetic fields in the air gap 116, a concomitant plurality of flux lines emerge from the respective stator poles 106 at respective ends opposite to the inner circumferential surfaces 118 of the stator poles 106. Ideally, the concomitant plurality of flux lines would be entirely contained within the stator iron 104. In a practical machine, however, a certain portion of concomitant magnetic flux escapes the stator iron 104, and is consequently disposed in spatial region 122 external to an outer boundary surface 124 of the stator iron 104. The magnetic flux within this external region 122 varies dynamically according to the plurality of currents, flowing within the stator pole windings 108, the rotational state of the rotor 110, and the magnetic permeability of the stator iron 104 and surrounding region 122.

The magnetic flux within this external region 122 tends to diminish with distance from the outer surface 124 of the stator iron 104. Nevertheless, the flux persists at detectable flux densities far beyond the outer confines of the motor 100, and indeed, far beyond the outer perimeter of the enclosing pod enclosure 55.

As shown in FIG. 2, one or more magnetic field generators 130 may be located in the region 122 external to the outer surface 124 of the stator iron 104 of the motor 100. Each magnetic field generator 130 is adapted to generate a magnetic field having magnetic flux 132 with a net magnitude and orientation substantially equal in magnitude and opposite in orientation to the magnetic flux generated within the spatial region 122 by the electrical currents within the stator windings 108. Ideally, the action of the magnetic field generators 130 is such that all magnetic fields, whether generated by the motor 100, or by the magnetic field generators 130, mutually cancel and thus fall to an attenuated value or substantially to zero magnitude well inwardly of any possible location of an unfriendly magnetic field detector 128.

According to one aspect of the invention, one or more magnetic flux sensors 136 are disposed within the spatial region 122. The sensors 136 detect the strength of any extant magnetic field within one or more portions of the spatial region 122. The magnetic flux sensors (magnetometers) 136 are arranged to detect field strength and/or flux density. The sensors 136 may be, for example, inductive sensors or Hall effect sensors, although other suitable sensors may also be employed. The sensors 136 may be of discrete or integrated circuit design. The sensors 136 may include integrated signal conditioning devices including filtering and amplifying circuits.

It should be noted that, while a particular type and configuration of motor (permanent magnet rotor motor) is presented in FIG. 2 for purposes of illustration, the invention may be equally well adapted to use in relation to other appropriate configurations of electric machinery or electrical equipment. Accordingly, in various embodiments, the invention may be adapted to attenuating undesirable external magnetic fields generated by motors and generators of a variety of configurations, transformers, switchgear, batteries, fuel cells, power supplies, bus bars, computer equipment, communications equipment, directed energy systems, or other equipment having conductors adapted to carry measurable electric current or moving permanent magnets.

The motor pod 54 (FIG. 3) includes an electric motor 100 equipped with a dynamic degaussing system according to one aspect of the invention. The motor is coupled to a propeller 60 by means of a shaft 114. The propeller may rotate within a region defined by hydrodynamic vanes 62.

Figure 3:
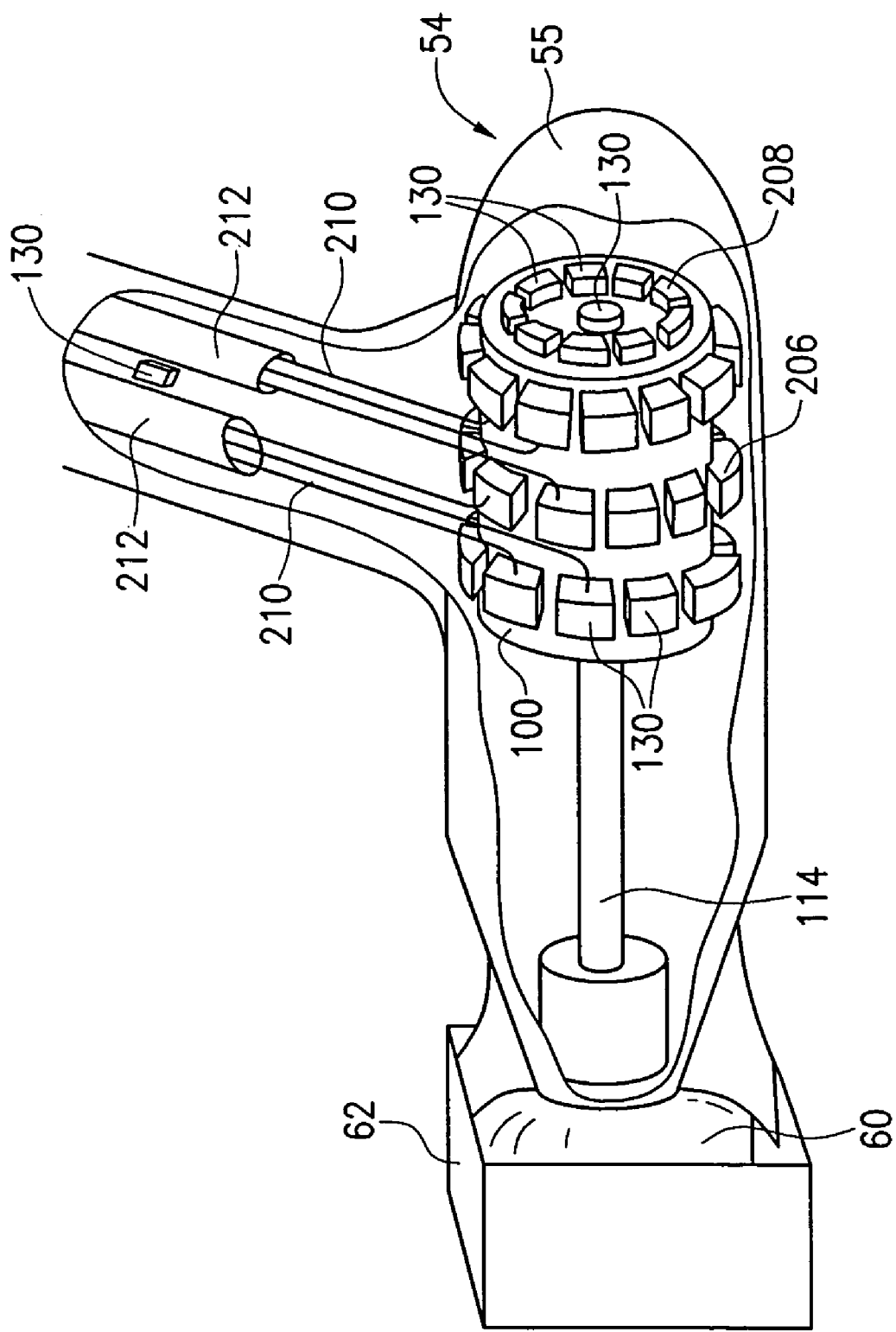
FIG. 3 is another broken away view of the electric motor of FIG. 2.

The illustrated degaussing system includes a plurality of magnetic field generators 130 disposed three dimensionally about a stator structure of the podded motor 100. As illustrated, some 206 of the magnetic field generators 130 are disposed circumferentially about the external surfaces of the motor 100 while others 208 are disposed in an arrangement coaxial with respect to the motor shaft 114 at one or the other end of the motor 100. The component placement represented in FIG. 3 is intended to be schematic, and the actual placement and configuration of magnetic field generators 130 would be governed by the particular design requirements and constraints of a particular application. Specifically, the number and placement of magnetic field generators would be selected so as to optimize the ability of the system to attenuate external magnetic fields.

As previously discussed with respect to FIG. 2, the magnetic field generators 130 of FIG. 3 generate attenuating magnetic fields that are opposed to the magnetic fields produced by the electric motor 100. These attenuating magnetic fields are generated by respective electrical currents supplied to the magnetic field generators 130 via a plurality of electrical conductors 210. In the illustrated embodiment, the conductors 210 are arranged in respective wiring harnesses 212, although other suitable constructions may be used.

Figure 4:
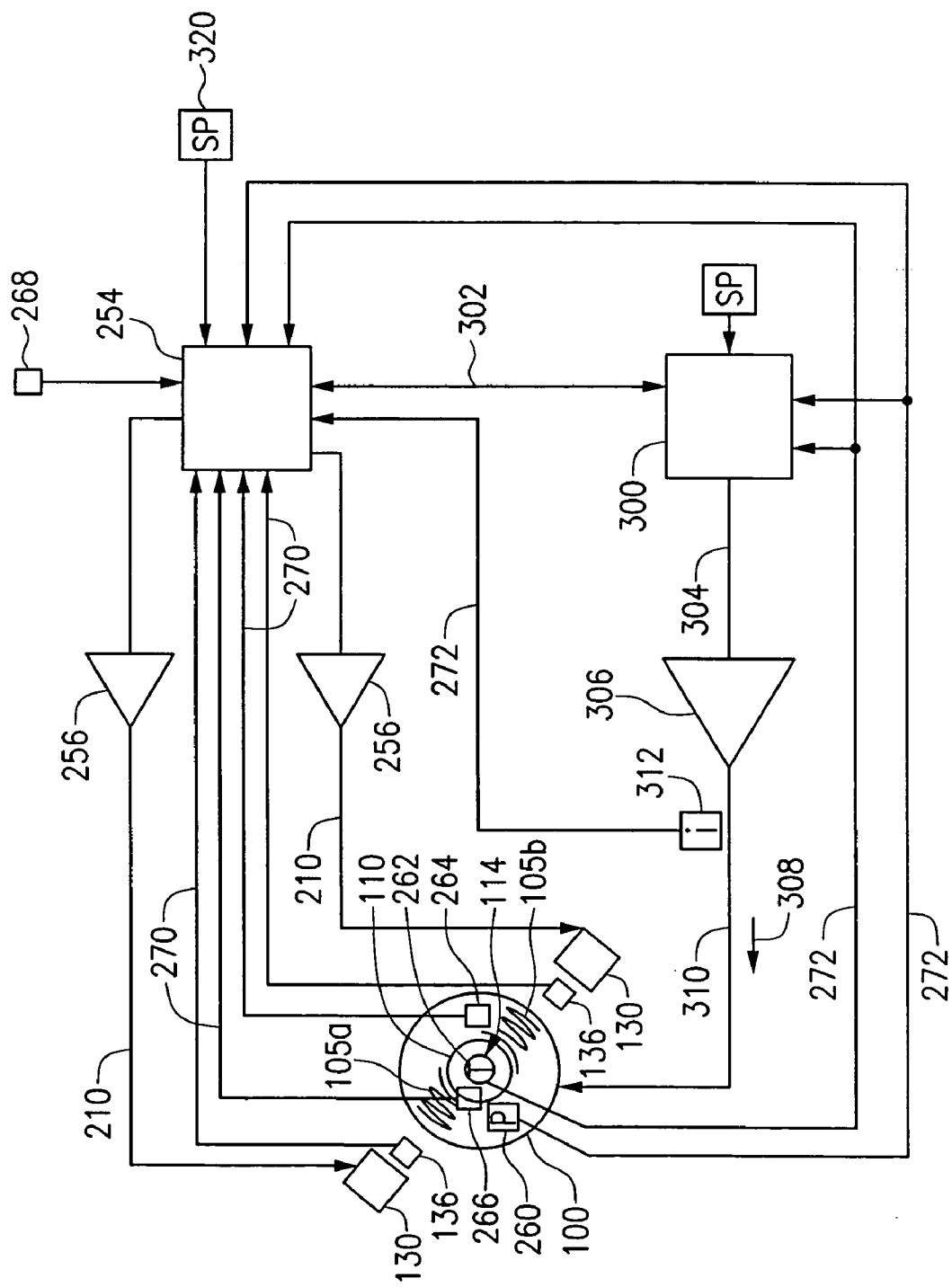
FIG. 4 schematically shows the motor of FIG. 3 connected to a control system.

Referring now to FIG. 4, a motor 100 is shown to have two stator poles 105a, 105b consisting of respective pole irons 106 and stator field coils 108 (pole windings). It should be noted that the number and placement of stator poles as well as the number and placement of sensors, magnetic field generators, and other components has been chosen for purposes of simplicity of illustration. Other numbers and locations of such respective components may be employed, if desired.

A suitable controller 254 is supplied for dynamically and individually controlling the current supplied to the magnetic field generators 130. By controlling the current in the lines 210, the controller 254 is able to dynamically and individually control the magnitude of the magnetic fields generated by the electromagnet coils of the generators 130.

The controller 254 signals respective amplifiers 256 to drive respective currents in lines 210 in response to data signals from magnetic sensors 136. The sensors 136 are disposed in fixed relation to the stator field coils 108 of the stator poles 105a, 105b. Additional sensors 264 may be disposed within and without the motor. Still other sensors 266 may be coupled to the rotor 110 of the motor and, accordingly, be adapted to move together with the rotor 110. The sensors generate signals that are representative of the strength of the magnetic fields produced by respective portions of the motor.

In addition to receiving signals from magnetic sensors, the controller 254 may optionally receive signals related to the position and acceleration of the rotor 110 from one or more position sensors 260 such as decoders and resolvers and, optionally, one or more tachometers 262 coupled to the motor 202. For example, a motion sensor may be coupled to the motor shaft 114 so as to detect rotational speed of the rotor 110, and thus allow for prediction of the spatial variation of magnetic fields associated with the motor 202 by, for example, feed-forward control.

According to one aspect of the invention, motor current 308 is sensed by a current sensor 312. The current sensor 312 provides a further control signal, related to motor current 308, to the controller 254.

The signals generated by the various sensors 136, 260, 264, 266, 312 may be transmitted to the controller 254 by suitable signal lines 270, 272 or wireless links. As illustrated, the sensor signals produced by the position sensor 260 and tachometer 262 are also received by a motor controller 300. Such sharing of sensor signals may be a function of other aspects of the system and redundant sensors may be employed instead. As shown in the embodiment of FIG. 4, one or more signal lines 302 may couple the motor controller 300 with the controller 254 for mutual communication of control signals.

The motor controller 300 produces an output control signal on an output line 304, which is coupled between the motor controller 300 and a motor power amplifier 306. The motor power amplifier 306 receives the control signal on line 304 and produces a corresponding motor current 308 on motor power lines 310. The motor power lines 310 electrically couple the output of the motor power amplifier 306 to the windings of the motor 202. The motor 202 is thus driven in response to the motor current 308.

According to one embodiment, the controller 254 also receives a user-definable setpoint signal from a signal source 320. The user-definable setpoint signal allows for adjustment of the controller 254 according to, for example, measurements made manually in the vicinity of the motor 202.

In response to the signals from the various sensors, the controller 254 individually controls the magnetic field generators 130 to (1) attenuate dynamic magnetic field components produced by the changing magnitude of various currents within the electrical equipment, (2) attenuate dynamic magnetic field components produced by the spatial motion of physical components within the electrical equipment, and (3) attenuate static magnetic field components produced by electrical components and by permanently magnetized non-electrical components of the electrical equipment.

Figure 5:
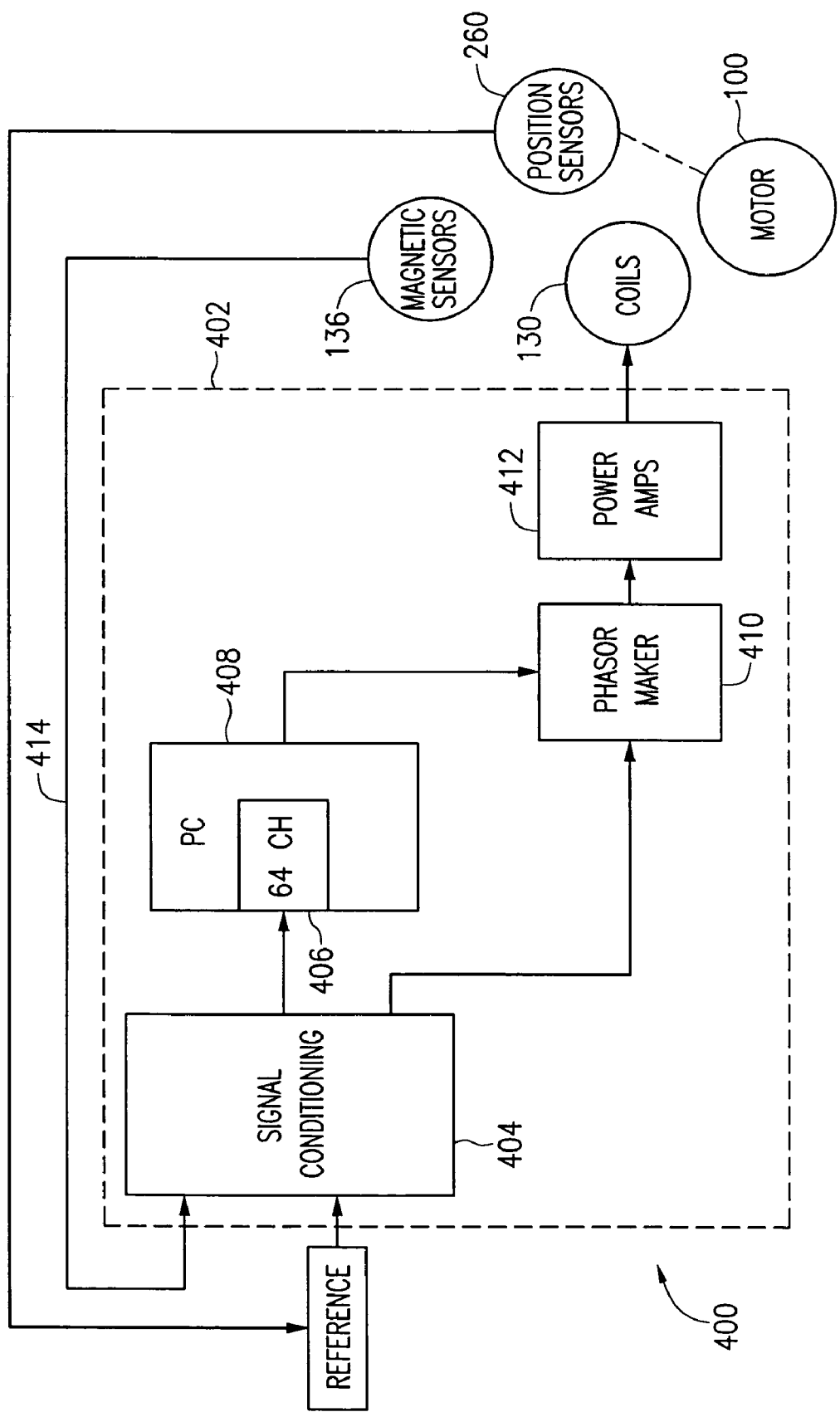
FIG. 5 is a block diagram of another control system constructed in accordance with the invention.

The active degaussing system 400 shown in FIG. 5 has three major parts: magnetic field generator coils 130 to generate the magnetic fields which oppose the motor field; sensors 136, 260 to measure the magnetic field around the motor and the shaft position of the motor; and electronics 402 to process the sensor readings and to drive the coils 130. In one embodiment, the sensors 136 are magnetometers arrayed around the motor in the near-field. A sinusoidal input is produced by the shaft position sensor 260 coupled to the motor shaft. All sensor inputs go through a signal conditioning stage 404, which is described in detail below. All of the sensor signals are digitized by an analog to digital converter on a data acquisition board 406 and input to a processor such as a personal computer (PC) 408 which runs a degaussing algorithm. The shaft position reference signal is also input to a phasor-maker 410, which is a digital-signal-processor-based computer that generates the signals that drive the magnetic field generator coils 130. The algorithm running on the PC 408 calculates the amplitudes and phases of the voltages needed to drive the coils to attenuate the motor field. These amplitudes and phases are transmitted digitally to the phasor-maker 410. The phasor-maker output signals are amplified by amplifiers 412 which in turn drive the actuator coils 130.

In one embodiment, the data acquisition board 406 includes a sharp anti-alias low-pass filter at 40% of the sample frequency. The data acquisition board 406 also features a programmable front-end gain between 10 and 0.1 to optimize signal levels. In a further aspect of the invention, a portion of the control algorithm implements automatic ranging to set the front-end gain.

In one aspect of the invention, the PC 408 is an IBM-compatible personal computer. In a further aspect of the invention, the data acquisition card 406 is a National Instruments model PCI-6071E produced by National Instruments Corporation of Austin, Tex. Data acquisition card 406 provides 64 channels of single-ended analog input, each of 12 bits of resolution. The acquisition card 406 is capable of conversion rates up to 200,000 samples per second. The algorithm may be implemented as a script running in a commercial software shell. According to this embodiment, the software shell is a Matlab software environment produced by the MathWorks, Inc. of Natick, Mass. The Matlab data acquisition toolbox is used to configure and control the National Instruments card 406, and to bring the data into the Matlab environment. The scripts provide for experiment configuration documentation as part of the data acquisition process. All experimental configuration parameters are stored with the data for each data collection, and are readily available for automated data analysis. Please note, however, that the present invention should not be limited to the specific features of the embodiments described in detail herein.

In one embodiment of the invention, the algorithm implemented for degaussing the motor assumes a quasi-steady-state magnetic field condition, where both the motor speed and load are constant. Under these conditions, the AC field component at any sensor location can be characterized by the amplitude and phase at each of the harmonics of the shaft rotation rate. Likewise the optimal solution for the magnetic field generator coil currents required to negate the motor field component at the same location can be characterized by the amplitude and phase of the applied voltage at these same harmonic frequencies. In a preferred embodiment of the invention, the fields generated by the magnetic field generators 130 are linearly proportional to the respective outputs of the controller 254. The job of the degaussing system is to calculate the required coil voltages, amplitudes and phases from the measurements of the motor magnetic field. All phases are measured relative to the reference signal, which is the motor shaft angle as measured by the position sensor 260.

According to one aspect of the invention, degaussing is performed with the motor operating at constant speed and load. In one embodiment, the magnetic sensors 136 include a suite of triaxial magnetometers situated at fixed locations around the motor 100. A series of measurements are then made to characterize the motor field, as well as the transfer functions from each coil 130 to each sensor channel. The transfer functions form a matrix of complex numbers such that, at each harmonic frequency, $$T\vec{c} = \vec{s}$$

where T is the transfer function matrix, c is the vector of complex coil voltage phasors, and s is the vector of complex magnetometer phasor measurements. T is computed from a series of measurements where the coils 130 are driven with known voltage amplitudes and phases while the response at each magnetic sensor 136 is measured. Once T has been measured, its pseudo-inverse is computed. In one aspect of the invention, there are many more field measurements than there are coils 130, so that the computation of the pseudo-inverse of T is over-constrained. The pseudo-inverse of T is then computed in a least-squares sense to minimize the norm of c, using singular value decomposition. This inverse of T is then used to compute the coil currents c which will best negate the measured motor field s at each harmonic frequency.

The sensors 136, the controller 254, and the magnetic field generators 130 form a first multi-channel control loop. The first control loop 414 may employ a modal matrix decomposition function to identify periodic functions characterizing the magnetic fields detected by the sensors 136. Once the periodic functions are identified, electrical currents corresponding to an inverse modal matrix configuration are supplied to the magnetic field generators 130 to attenuate or substantially cancel out the external magnetic fields generated by the motor 202. A suitable signal processing technique for the first control loop is described in U.S. Pat. No. 5,022,628, the entire disclosure of which is incorporated herein by reference. Other signal processing techniques may also be used, if desired.

The phasor-maker 410 is a digital signal processor (DSP) based computer whose function is to translate an input set of complex numbers, or phasors, which define the sine waves at each of the multiple tones, into time-varying voltages to be applied to each of the magnetic field generator coils 130. The phasor-maker 410 takes these phasors, along with the reference signal from the motor position sensor 260 and produces sine wave voltages. The sine wave voltages are computed digitally, summed together and converted to analog signals using one digital-to-analog converter (DAC) for each of the possible coil output channels. Alternately, digital conversion may be achieved using one DAC in combination with plural sample and hold circuits. In one aspect of the invention, full-scale output is +/−1.25V.

In a further aspect of the invention, the amplifiers 412 have a settable gain of between 1 and 20. The time-dependent voltages produced by the phasor-maker 410 are input directly to each amplifier 412.

According to one embodiment, twenty-two of the amplifiers 412 are connected to, and drive, twenty-two respective actuator coils 130 arrayed around a motor 100. In one embodiment of the invention, the actuator coils 130 are designed to have an area of about 0.02 m$^2$ and 100 turns, with a DC resistance of about 5Ω. The coil geometry is chosen so that eighteen nominally identical coils (3 times the number of poles in the motor) will fit around the circumference of the motor.

Figure 6:
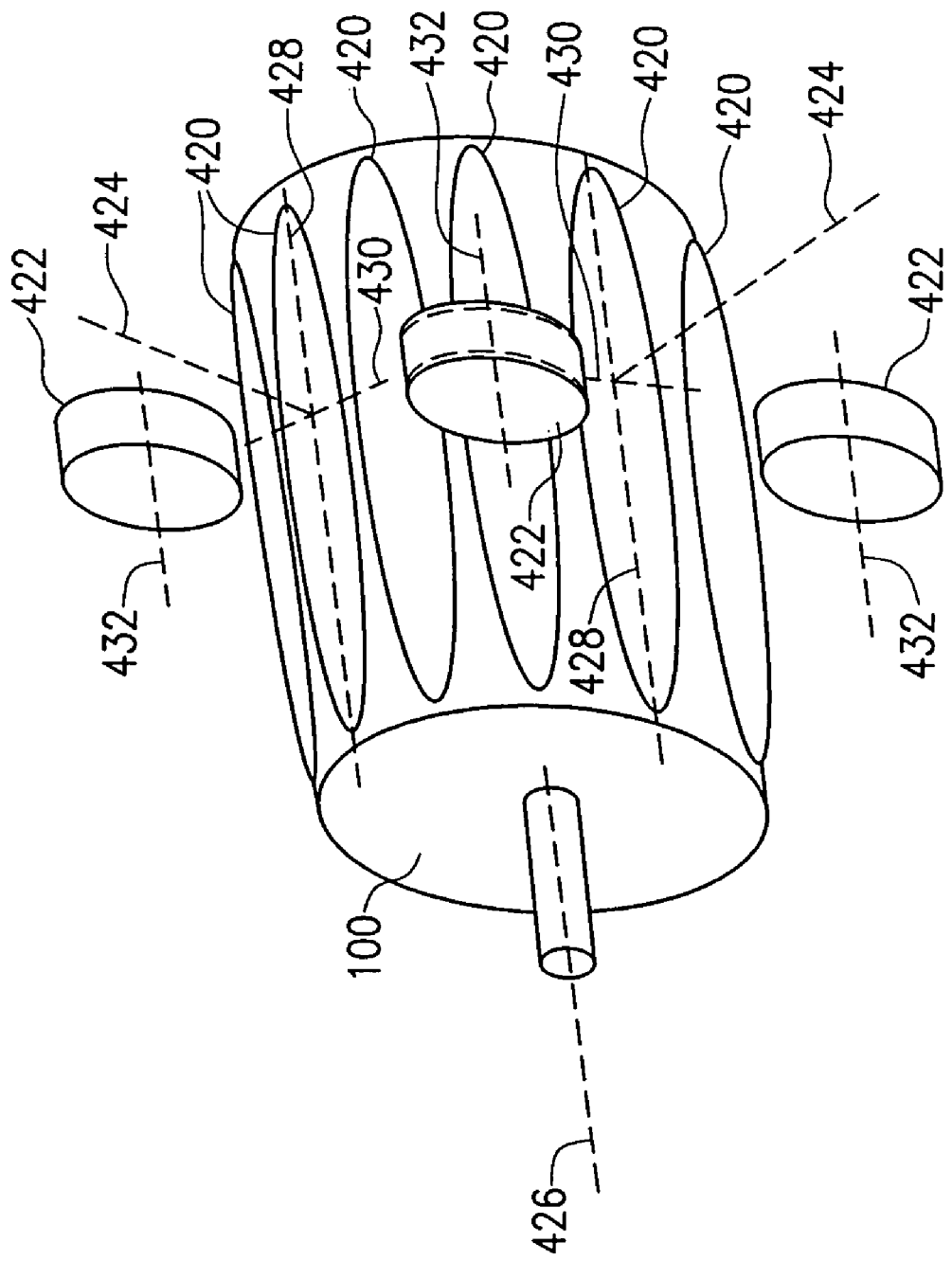
FIG. 6 is a schematic representation of a motor including magnetic field generating coils.

As shown in FIG. 6, certain main coils 420 of the coils 130 are wound about a central axis 424 perpendicular to a longitudinal axis 426 of the motor shaft 114. The main coils are elongate, having a long axis and a short axis 430, each perpendicular to the central axis 424 of the coil 420. The long axis 428 of the coil 420 is oriented substantially parallel to the axis 426 of the motor shaft. The length of the coil 130 in the direction of the long axis closely matches the corresponding length of the motor windings. The number of turns in each coil is chosen such that the combination of coils can produce a sufficient magnetic moment to negate the motor field based upon previous motor characterization measurements.

In one aspect of the invention, each coil 130 is designed such that coil impedance is primarily resistive throughout the operational frequency range. In a further aspect of the invention, the eighteen main coils 420 are located with their central axes 424 perpendicular to the motor axis 426 and such that the respective main coil axes 424 pass through the center of the motor 100. The coils are evenly spaced around the motor circumference at 20° intervals. Four ancillary coils 422 are positioned with axes 432 which are parallel to the motor axis 426, and are spaced 90° apart around the axis 426 of the motor 100.

The magnetic field generators 130 of FIG. 6 may be rigidly and integrally connected to the frame of the motor 100 or may be mounted externally to the motor frame on an independent framework, or on an equipment housing, such as a motor pod enclosure 55 (FIG. 3). For example, the magnetic field generators 130 may be connected to the motor framework by steel bolts (not illustrated). Alternately, magnetic field generators 130 may be welded to the frame of the motor. The magnetic field generators 130 may also be mounted to the frame of the motor by a polymer substance such as an adhesive, or an elastomeric pad.

Figure 7:
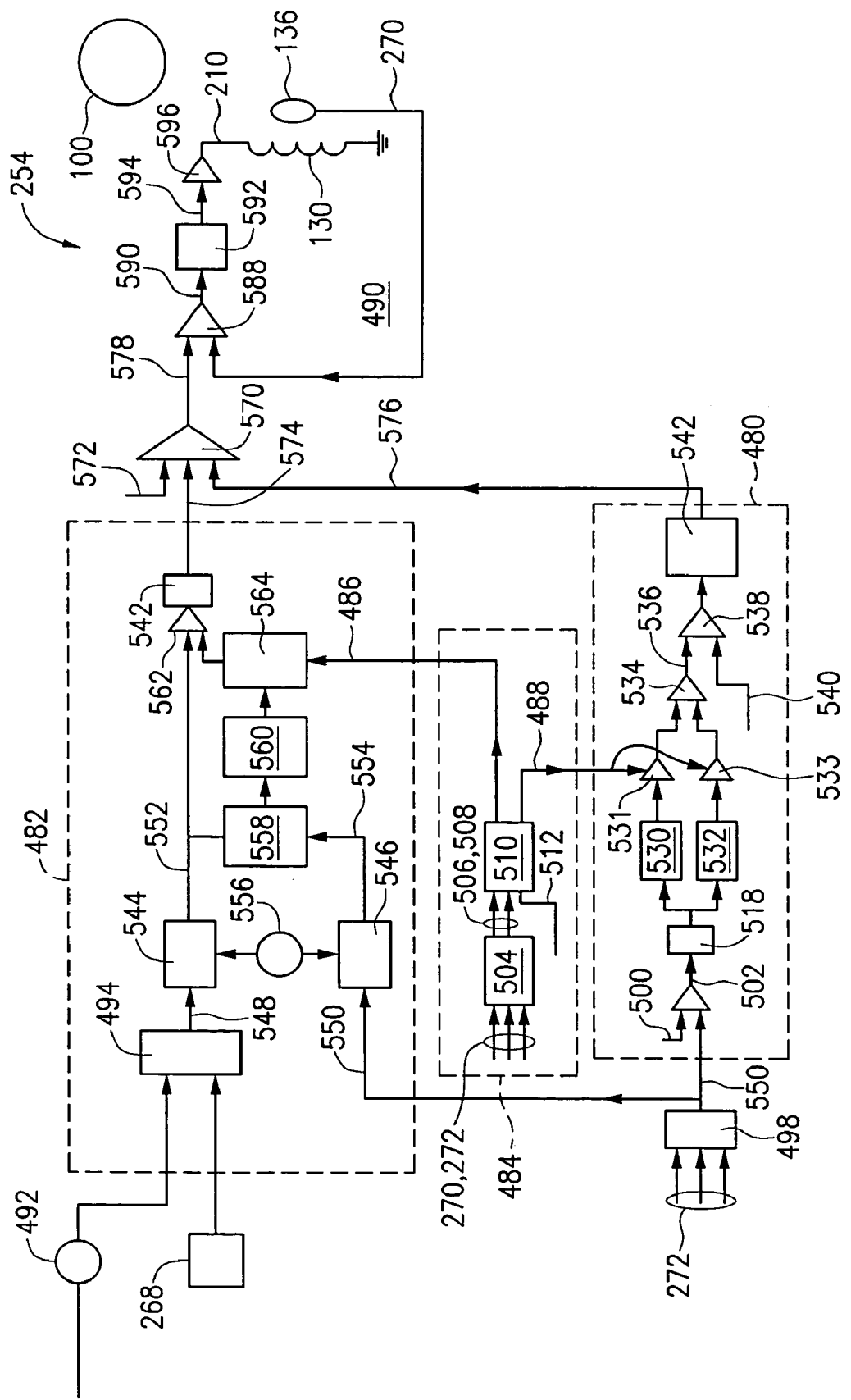
FIG. 7 is a block diagram of another control system constructed in accordance with the invention.

As shown in FIG. 7, two multi-channel control loops 480, 482 may be provided to attenuate the dynamic magnetic fields produced by the motor 100. In general, resonant modes of the controlled system (motor and degaussing apparatus) are suppressed using feedback controls 480. Tonal signals, whether or not at resonant frequencies of the system, are controlled using adaptive feedforward controls 482. Dynamic state and plant estimators 484 track certain dynamic aspects of the system (via signals from the various sensors received on lines 270, 272). The tracked dynamic aspects may include a variety of mechanical and electrical parameters, such as the position, velocity and acceleration of the rotor, stator currents, magnetic flux density at various locations, the ambient temperature of the system, heading and depth etc. In a preferred embodiment of the invention, the dynamic state and plant estimators 484 provide essentially instantaneous plant transfer function estimates 486 as well as optimal control gains 488 for the feedforward and feedback controls 482, 480, respectively. Thus, the combined current demands from the feedforward and feedback controls 482, 480 can be used to drive control servo loops 490 that inject the proper currents into the magnetic field generators 130. There is a control servo 490 for each magnetic field generator 130.

A practical system may have a large number of sensors and field generators 130. That is, the system 254 may be constructed with (referring to FIG. 4) N magnetic sensors 136, M magnetic field generators 130, P modes to control, and Q references for tonal excitations. The control system 254 may be a digital electronic control system. All of the sensor inputs are digitized at S samples per second, and all computations in the control system 254 are updated digitally at the same rate.

Referring again to FIGS. 4 and 7, the Q references are Q numerically controlled oscillators (NCO's) 492—one NCO 492 for each reference sensor 268. A multiplexer 494 is used to track the reference signal from the reference sensor 268 with a hardware tachometer 262, the output of the NCO 492, or through other suitable means. The NCO 492 updates its complex phasor output each cycle to generate sine and cosine waves at its operating frequency or at a suitable harmonic of its operating frequency.

The inputs from the feedforward sensors 260, 262, 312 are reconverted to mode shapes for multiplication by a modal decomposition matrix 498, which may be the identity matrix for systems with largely independent modes that can be sensed at one point. The modal decomposition matrix 498 generates P output estimates 550. Each modal estimate 550 is compared to a modal set-point 500 to generate modal error estimates 502. For the illustrated embodiment, where it is desired to obtain essentially complete suppression of external magnetic fields, the modal set-point 500 is zero.

Modal decomposition using the modal decomposition matrix 498 allows the selective suppression of specific magnetic field modes. In particular, it is desirable to suppress those magnetic field modes that would be detectable at an appreciable distance from the magnetic field source. Such detectable magnetic field modes may especially include far field modes and propagating modes. Correspondingly, it is undesirable to expend substantial resources suppressing magnetic field modes that, while perhaps significant in the vicinity of the magnetic sensors 136, are not significant in regions that may be occupied by a detector 128. By modal decomposition of the incoming signals using modal decomposition matrix 498, the control system 254 may be applied to selectively suppress magnetic field modes detectable by a detector 128. Consequently, rather than being adapted to drive all fields to reduced field strength in a region 122 (see FIG. 2) adjacent to magnetic field sensors 136, the control system 254 may be optimized to attenuate only those magnetic fields modes which would otherwise be perceptible by a detector 128. In one aspect of the invention, the modal decomposition matrix 498 may be implemented as a partial matrix so as to selectively produce signals corresponding to magnetic modes that it is desirable to suppress. A partial matrix is a matrix including one or more null-valued elements.

Environmental data is obtained from the magnetic sensors 136 and the other data input devices 260, 262, 266, 268, 312 (FIG. 4). A computational block 504 converts the environmental data into instantaneous plant transfer function estimates 506 and variable control gains 508. The computational block 504 may employ interpolated look-up tables, polynomial curve fitting, or other techniques, to provide smooth updates as the environmental data change over time.

A logic block 510 is used to modify the plant transfer function estimates 506 and the variable control gains 508. Manually entered gain adjustments 512 can be added to the automatically-generated control gains 508 to produce the final feedback control gains 488. The system elements contained within the feedback loop 480 have their transfer functions modified by the feedback gains 488 resulting in the final feedforward plant estimates 486.

To further understand the numerical operation of the control system 254, one may consider a system element having complex transfer function H from flux demand to monitored magnetic flux. In the absence of feedback control, the plant transfer function is simply H. If the system element is then controlled by a negative feedback loop with compensator transfer function G, then from the perspective of feedforward, the effective plant transfer function becomes H/(1+GH). If the feedback loop has an additional gain k (e.g., from an operator override), the function is then H/(1+kGH). The control system 254, knowing the complex transfer function H from its system identification and environmental monitoring, and calculating G and k in real-time, can compute H/(1+kGH) in real-time also.

The modal error estimates 502 are passed through fixed filters 518 and adjustable-gain filters 530, 532 to produce stable feedback control loops. In the illustrated embodiment, the adjustable gain filters 530, 532 include two bandpass filters in quadrature, so that arbitrary phase shifts of the error signals can be accomplished by suitable choices for the feedback control gains 488. The control gains 488 are applied to amplifiers 531, 533. Block 534 sums the outputs of the adjustable-gain filters 530, 532, thereby forming the modal signal output 536 for each of the P feedback control loops. The output signals 536 are added 538 to a disturbance signal 540. The disturbance signal 540 introduces a deliberate impulse signal for system identification. A modal signal reconstitution matrix 542 (which may be the identity matrix) allocates the signals required for modal control to the demands for the electromagnets of the individual magnetic field generators 130. As discussed above, it may be desirable to reconstitute fewer than all of the magnetic modes. The modal reconstitution matrix 542 may be configured so as to reconstitute only those modes that would otherwise be detectable by an external detector 128 (see FIG. 2).

Computation blocks 544, 546 convert Q selected references 548 and P modal estimates 550 into respective narrowband complex phasor representations 552, 554. The process used is that of complex heterodyning. For each reference or modal estimate, a digital local oscillator (LO) 556, which may be identical in function to the NCOs 492, defines the center frequency of the filtering process. First the complex conjugate of the LO is multiplied by the modal estimate to create a complex signal that contains both the desired tonal component, near DC ("baseband"), plus an image tone at the sum of the frequencies of the modal input and the LO. A digital low-pass filter then removes the image components, isolating the desired tonal information at baseband. A final complex multiplication by the LO then upconverts the signal to its original frequency, but now as a complex analytic signal.

In an alternative embodiment of the invention, a digital Hilbert transform may be employed. Techniques based on complex heterodyning and the Hilbert transform are well known in connection with radar signal processing and communications applications. The techniques are discussed in more detail in Alan V. Oppenheim & Ronald W. Schafer, Digital Signal Processing, 1975, ISBN 0-13-214635-5, section 7.4, the entire disclosure of which is incorporated herein by reference.

Yet another computational block 558 creates Q×P estimates of error with respect to the various references 548. Estimate Eij of the error in $i^{th}$ mode with respect to the $j^{th}$ reference is simply the complex value of Ei/Rj where Ej is phasor 554 representing the modal estimate, and Rj is phasor 552 representing the reference. Computational block 560 compensates for references 548 that may be so close in frequency that they correlate over integration periods comparable to the adaptation times. The operation of block 560 is as follows, illustrating a case where references j1 and j2 are close in frequency: Error estimate Ei-j1 is time averaged to form Vi1 for all i from 1 to P. Error estimate Ei-j2 is time averaged to form Vi2 for all i from 1 to P. The ratio Rj2/Rj1 is time averaged to give B12. Before use in adaptation, Ei-j1 is replaced with Ei-j1=Vi1−Vi2*B12. Similarly, Ei-j2 is replaced with Ei-j2=Vi2−Vi1*conjugate(B12). In this embodiment of the invention, it is important to use the same type of time average throughout the block. Please note, however, that the present invention should not be limited to the details of the embodiments described herein.

Complex multipliers 562 apply the optimal complex gains to each reference 548 to create signal current demands for each mode. Another computational block 564 updates the complex multipliers 562 based on the error signals (558, 560) and instantaneous plant transfer function estimates 486. The modal signal reconstitution matrix 542 is then used to allocate feedforward signals among the various magnetic field generators 130. The computational block 564 controls the gain of the complex multipliers 562.

The accuracy of operation of each magnetic generator may be improved as follows. A computation block 570 is used to sum the sensed field demands 574, 576 for each magnetic field generator 130. The inputs to the summation block 570 include the following: a deliberate disturbance term 572, the feedforward component 574 calculated by the feedforward unit 482, and the feedback component 576 calculated by the feedback unit 480. The computation/summation block 570 computes the magnetic flux density 578 that should be generated by the magnetic field generator 130 (i.e., in the region 122 of FIG. 2) to achieve the desired magnetic field attenuation.

In operation, the flux sensor 136 senses the actual flux in the region 122. The sensed flux is subtracted from the desired flux 578, required to attenuate magnetic flux in region 128 (computation block 588) to obtain a flux error value 590. The error value 590 is passed through a digital compensation filter 592 and reconverted to an analog input 594 to the power amplifier 596 for the magnetic field generator 130. The analog input 594 may be either a voltage demand or a current demand, depending on the type of compensation filter 592 that is employed. The power amplifier 596 drives the magnetic field generator 130 to produce the desired flux, and hence reduce extant flux in region 128.

Figure 8:
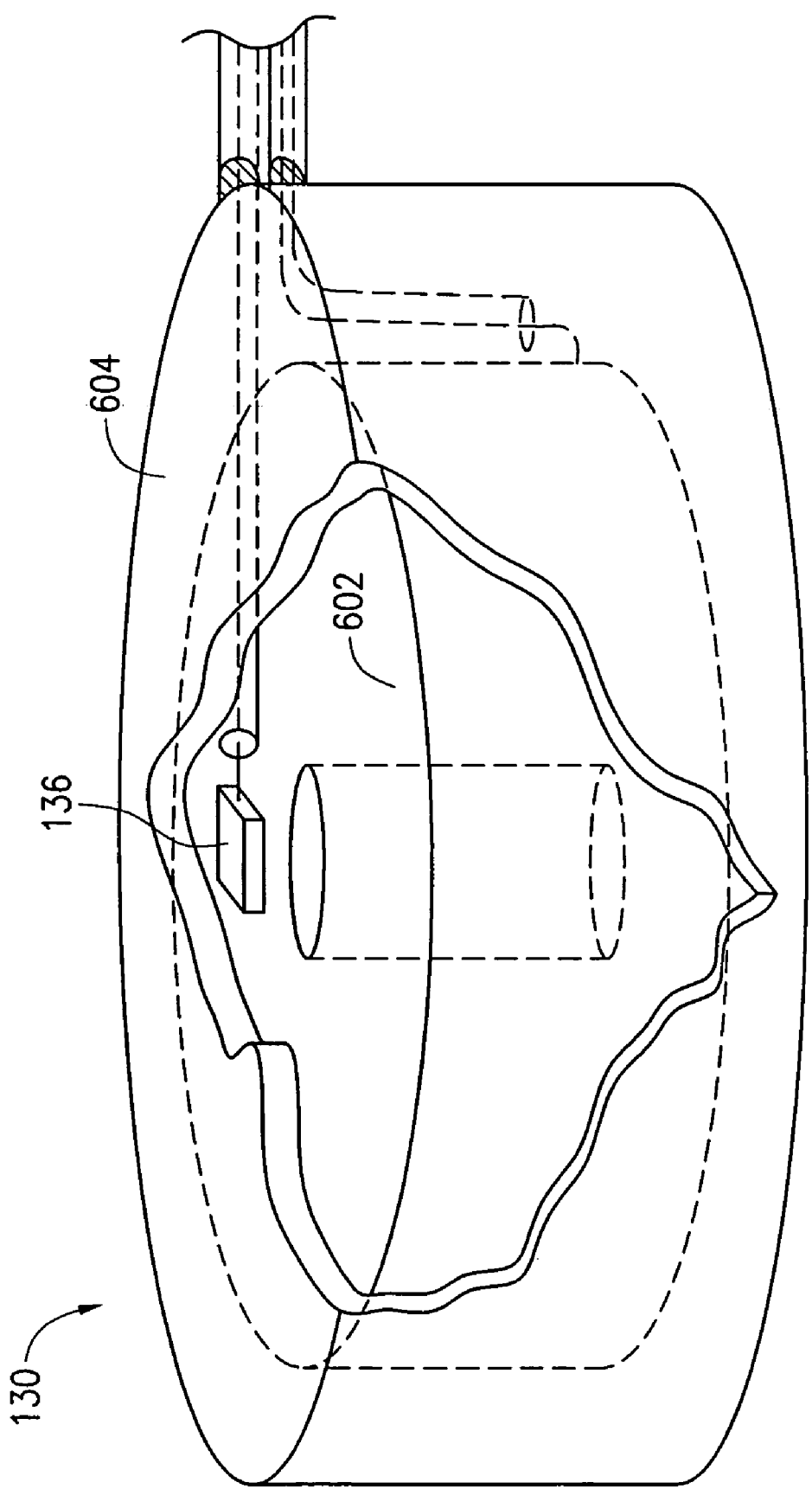
FIG. 8 is an integrated magnetic field generator and magnetic field sensor, showing the arrangement of a sensor and a magnetic field generator according to one aspect of the invention.

FIG. 8 shows a magnetic field generator according to one aspect of the invention, including an integrated electromagnet coil 602 having an iron free core and an integrated magnetic sensor 136. The electromagnet coil 602 and integrated sensor 136 are preferably hermetically sealed within an enclosure such as a block of epoxy potting compound 604. Preferably, the epoxy potting compound 604 is selected to have a low magnetic permeability so that the magnetic flux sensed by the sensor 136 and generated by the coil 602 is substantially unaffected by the presence of the potting compound.

Figure 9:
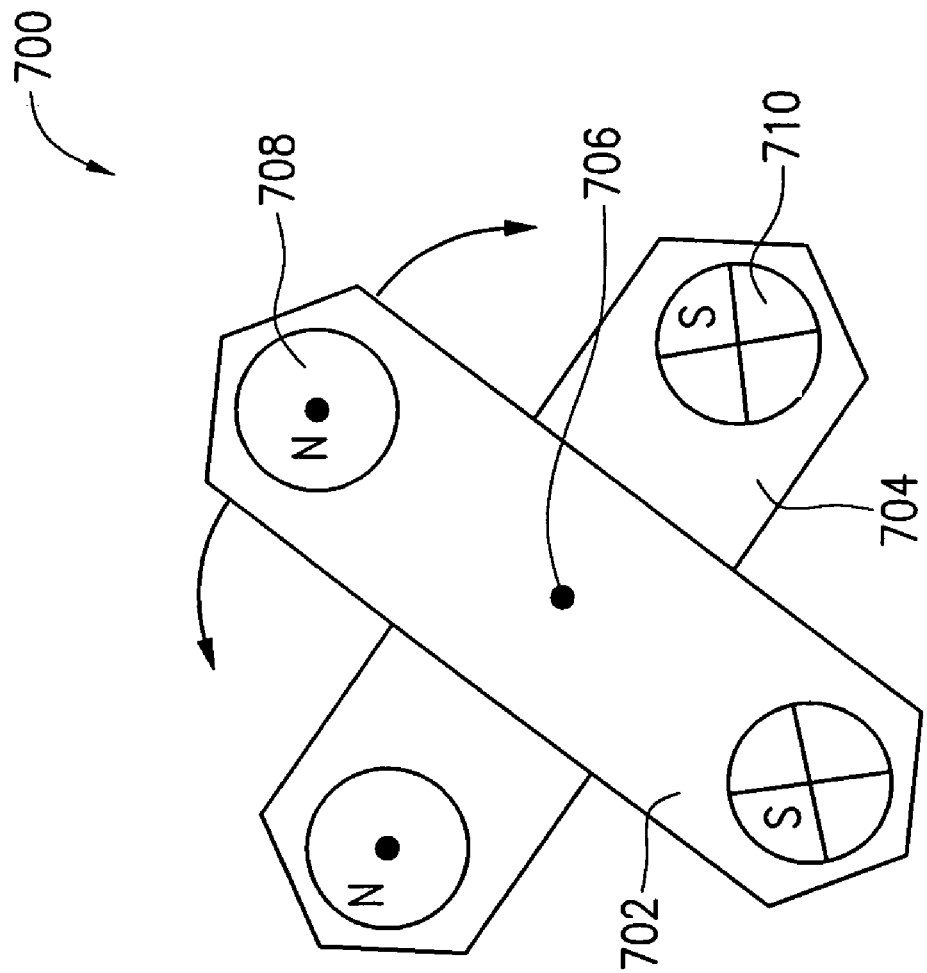
FIGS. 9 through 11 show a static field magnetic device according to one aspect of the invention.
Figure 11:
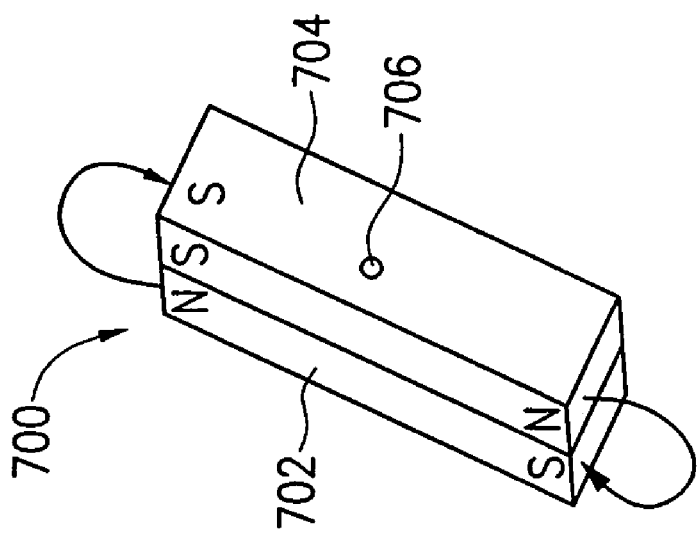
Figure 10:
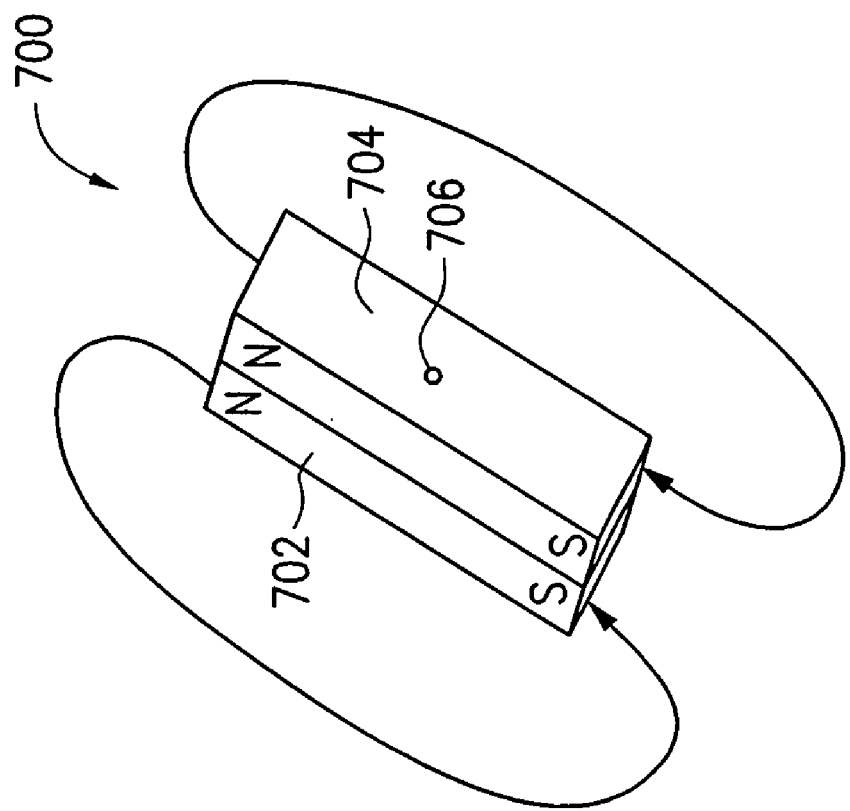

FIGS. 9–11 show a further aspect of the invention including providing a permanent magnet device 700 including two rotatably connected magnetic structures. As illustrated, the device includes first and second legs 702, 704 formed of, for example, a polymer material (9a). Non-polymeric materials such as metal may also be applied and, if desired, the legs 702, 704 may be entirely magnetic. The legs 702, 704 are pivotally connected at a pivot such as a rivet or bolt 706. With respect to FIG. 9a, at least a first permanent magnet 708 is attached to a first one of the legs, e.g., 702. At least a second permanent magnet 710 is attached to a second one of the legs, e.g., 704. The orientation of the first magnet 708 is antiparallel to that of the second magnet 710. Also, the magnets 708, 710 may be of substantially equal strength. With respect to FIGS. 9–11, by rotating the two legs 702, 704 in relation to one another, the net magnetic flux out of the permanent magnet device 700 is adjustable to provide a net local magnetic dipole of a desired flux density and orientation. The field produced by the device 700 is a static magnetic field. Hence the device may be used to attenuate an extant static field or the static component of a magnetic field including both static and dynamic components. Accordingly, one or more of the permanent magnet devices 700 may be placed in the vicinity of a magnetic source and adjusted to reduce or cancel static magnetic fields. In another aspect of the invention, one or more of the permanent magnet devices 700 may be affixed to a rotor of a motor so as to attenuate magnetic fields that are dynamic with respect to an external environment of the motor. Attenuation of static and dynamic fields reduces the net currents required in dynamic field cancellation coils. As is readily understood, the magnet device 700 may include more than two legs and more than two magnets according to the requirements of a particular application. As is also readily understood, the magnet device 700 may be fixed in place with respect to, for example, a motor by the use of any appropriate adhesive or mechanical fastener, or a combination thereof, or by magnetic attraction.

Figure 12:
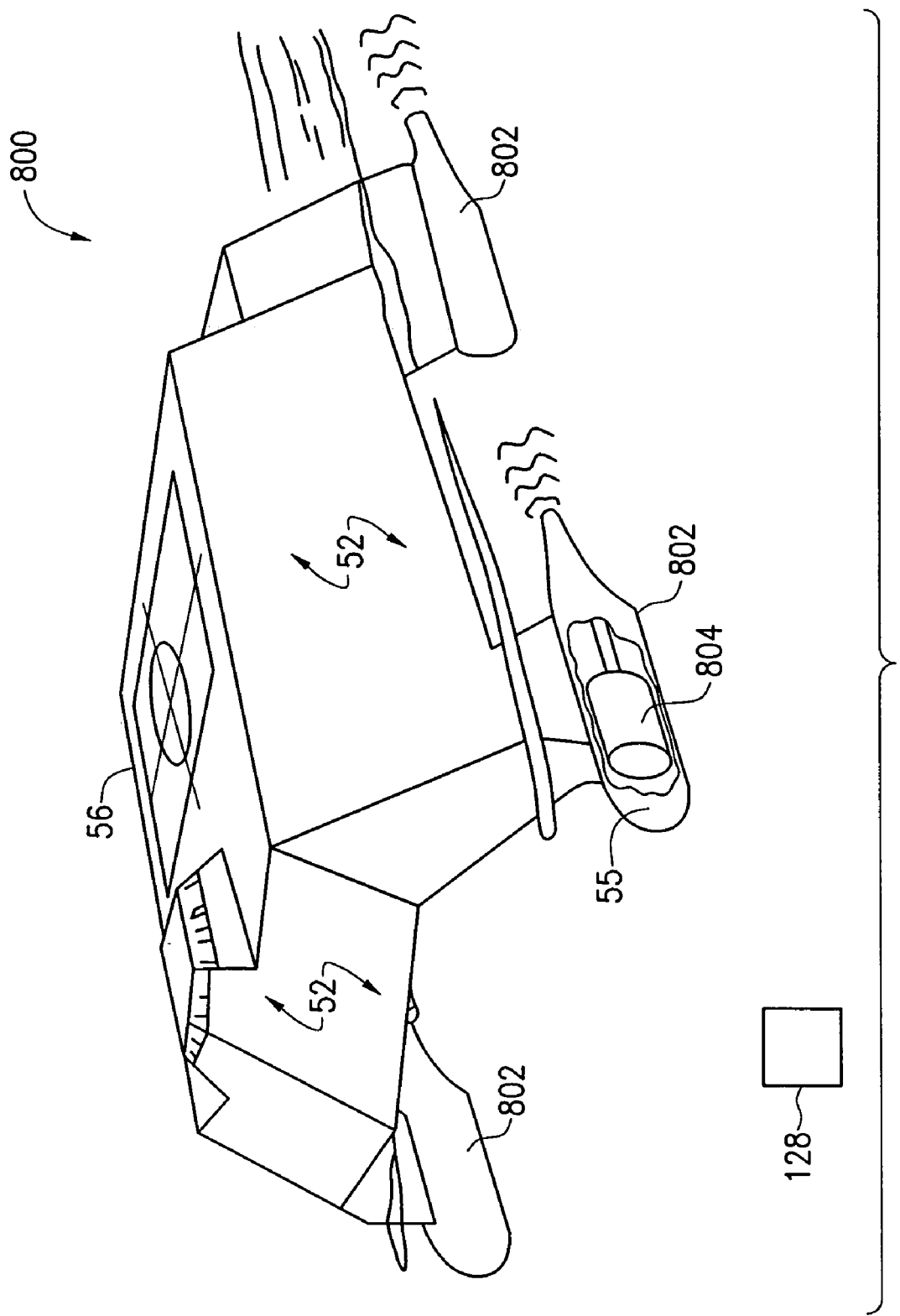
FIG. 12 shows a further embodiment of the invention including a naval vessel with external motor pods.

FIG. 12 shows a further embodiment of the invention including a naval vessel 800 with external motor pods 802 each containing an electrical motor 804. The electrical motor 804 is degaussed by a degaussing system that controls currents conducted through various windings of the motor 804 so as to minimize external magnetic fields. In other respects, the vessel 800 is the same as vessel 50 of FIG. 1.

Figure 13:
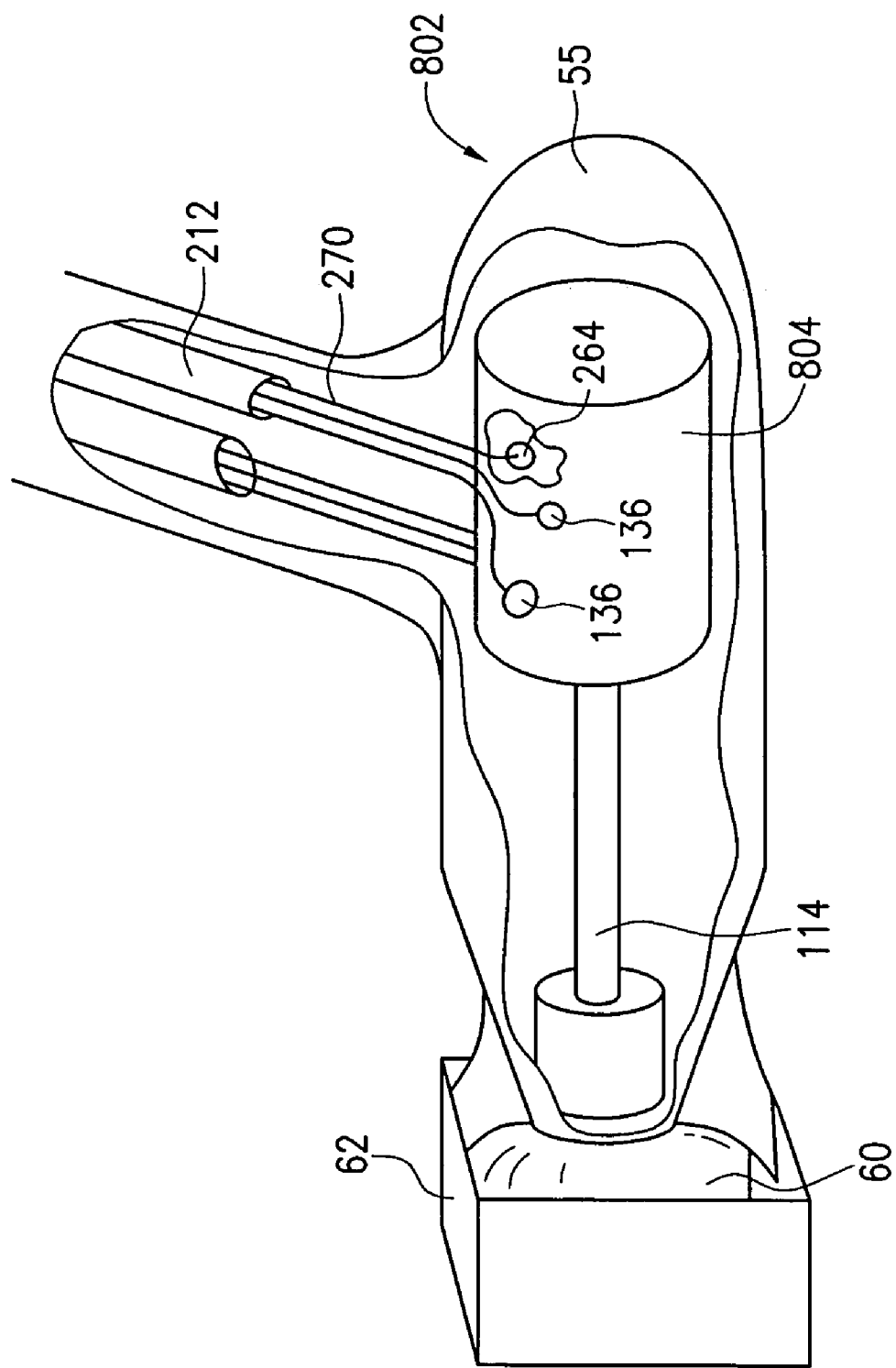
FIG. 13 shows the motor pod 802 of FIG. 12 in additional detail.

FIG. 13 shows the motor pod 802 of FIG. 12 in additional detail. The pod 802 includes a motor 804. Magnetic field sensors 136 are disposed in a region within the pod 802 but outside of the motor 804. Other magnetic field sensors 264 may be disposed within the motor 804, as is described above with respect to the FIG. 4 embodiment. The motor of the FIG. 13 embodiment includes windings that carry electric currents. The electric currents are controlled to reduce or eliminate external magnetic fields. Accordingly, the pod 802 of the FIG. 13 embodiment may include fewer magnetic field generators than the FIG. 3 embodiment pod, or may include no magnetic field generators at all, relying on control of the motor winding currents to effect attenuation of external magnetic fields. In other respects, the podded motor 802 of FIG. 13 is the same as that of FIG. 3.

Figure 14:
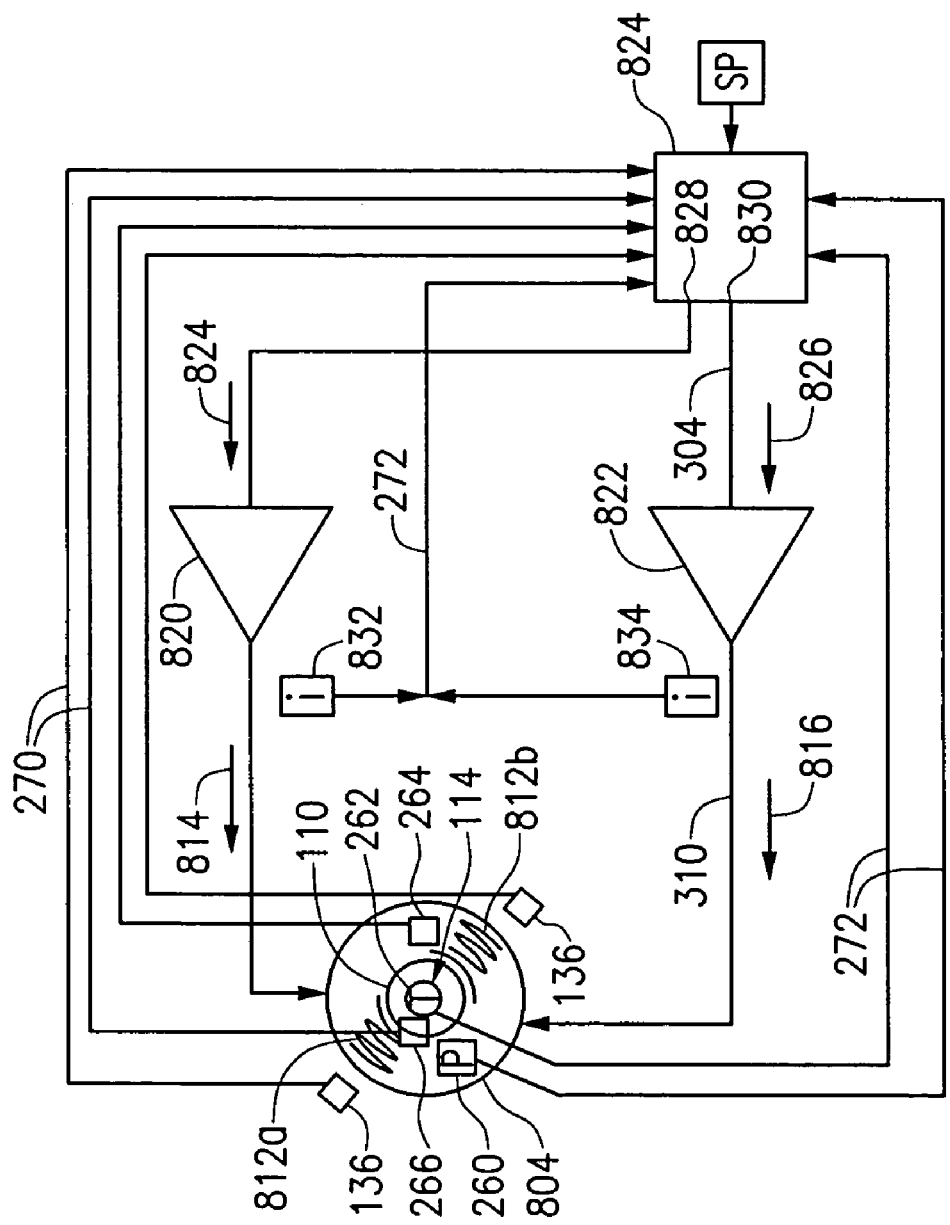
FIG. 14 shows a further embodiment of a motor and degaussing system according to the invention.

Referring now to FIG. 14, the FIG. 13 motor 802 is shown schematically to have two stator poles 810a, 810b, consisting of respective pole irons 106 and respective stator field coils 812a, 812b (pole windings). As in the FIG. 4 embodiment, the number and placement of stator poles as well as the number and placement of other components has been chosen for purposes of simplicity of illustration. Other numbers and locations of such respective components may be employed, if desired. The stator field coils 812a, 812b of the motor 802 of FIG. 14 are adapted to receive respective independently controlled electric currents 814, 816. Currents 814, 816 are supplied by respective amplifiers 820, 822 which are coupled at respective outputs to stator field coils 812a, 812b. Amplifiers 820, 822, in turn, receive respective control signals from respective outputs 828, 830 of the motor controller 824. A plurality of magnetic field sensors 136, 264 are disposed in respective locations outside of and inside the electric motor 804. The magnetic field sensors 136, 264 are coupled to respective inputs of the motor controller 824. In like fashion, position sensors 260 and tachometers 262 may be mechanically coupled to the motor 804, and electrically coupled to respective inputs of the controller 824. In addition, current sensors 832, 834 may be positioned to measure the respective amplitudes of currents 814, 816. The current sensors 832, 834 are signalingly coupled to the motor controller 824. The motor controller thus receives signals from the various sensors 136, 264, 260, 262, 832 and 834 and responsively adapts the control signals 824 and 826 so as to minimize the magnetic fields detected outside of motor 804.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

The present invention is not limited to the preferred embodiments shown and described herein. In particular, the invention may be used with a wide variety of systems and apparatuses including, but not limited to, ships of all kinds, submarines, fixed wing aircraft, helicopters, air-cushion vehicles, treaded vehicles, tired vehicles, hybrid vehicles, and other mobile and stationary equipment containing electrical systems including measuring instruments and manufacturing equipment. The invention may also be used to attenuate magnetic fields for purposes of industrial hygiene, and the shielding of sensitive instruments and/or data storage media from spurious signal sources.

What is claimed as new and desired to be protected by Letters Patent of the United States is:

1. A dynamic degaussing system comprising:
a magnetic field sensor adapted to generate a sensor signal in response to a sensed magnetic field;
a controller adapted to receive said sensor signal and produce an output signal, said controller including feedforward and feedback control loops; and
a magnetic field generator adapted to receive said output signal and generate a responsive magnetic field, said responsive magnetic field adapted to attenuate said sensed magnetic field.

2. A dynamic degaussing system as defined in claim 1, wherein said controller further comprises a modal decomposition matrix.

3. A dynamic degaussing system as defined in claim 2, wherein said modal decomposition matrix comprises a partial matrix.

4. A dynamic degaussing system as defined in claim 1, wherein said controller further comprises a modal reconstitution matrix.

5. A dynamic degaussing system as defined in claim 1 wherein said sensed magnetic field is an external magnetic field of an electric motor.

6. A dynamic degaussing system as defined in claim 1 further comprising a podded electric motor of a naval vessel.

7. A dynamic degaussing system as defined in claim 6 further comprising a shaft position sensor mechanically coupled to a shaft of said electric motor and signalingly coupled to said feedforward portion of said controller.

8. A dynamic degaussing system as defined in claim 1 wherein said control system further comprises a logic block adapted to modify a transfer function representing a motor system, said motor system being a source of said sensed magnetic field.

9. A dynamic degaussing system as defined in claim 1 wherein said magnetic field generator comprises a coil of insulated wire adapted to generate a magnetic field in response to an applied electric current.

10. A dynamic degaussing system as defined in claim 1 wherein said magnetic field generator comprises a magnetic field generating coil hermetically sealed within a polymer housing, said polymer housing coupled to an electric machine producing said sensed magnetic field.

11. A dynamic degaussing system as defined in claim 10 wherein said polymer housing also encloses said magnetic field sensor.

12. A dynamic degaussing system as defined in claim 1 wherein said controller system comprises a digital electronic control system.

13. A dynamic degaussing system as defined in claim 12 wherein said digital electronic control system comprises a digital signal processor.

14. A dynamic degaussing system as defined in claim 1 wherein said feedforward control loop of said control system comprises a processor adapted to execute a modal matrix decomposition algorithm.

15. A motor system comprising:
an electric motor;
a motor controller electrically coupled to said electric motor and adapted to supply a plurality of driving electric currents to said electric motor;
at least one sensor signallingly coupled to said motor controller and adapted to supply at least one sensor signal thereto, whereby said motor controller modifies one or more driving electric currents of said plurality of driving electric currents in response to said at least one sensor signal so as to reduce an external magnetic field generated by said electric motor.

16. A motor system as defined in claim 15 wherein said external magnetic field generated by said motor comprises a far field magnetic field mode.

17. A motor system as defined in claim 15 wherein said external magnetic field generated by said motor comprises a propagating magnetic field.

18. A motor system as defined in claim 15 wherein said motor controller further comprises a modal decomposition matrix adapted to modify respective amplitudes and waveforms of said plurality of driving electric currents.

19. A motor system as defined in claim 15 further comprising:
at least one sensor signalingly coupled to said motor controller and adapted to supply at least one sensor signal thereto, whereby said motor controller is adapted to supply one or more electrical currents to one or more respective magnetic field generators responsive to said at least one sensor signal.

20. A vehicle comprising:
an electric motor for moving said vehicle; and
a dynamic degaussing system, for dynamically degaussing said motor, said system comprising a plurality of magnetic field detectors, a plurality of electromagnets, and a control system coupled between said magnetic field detectors and said electromagnets for driving said electromagnets to attenuate an electric field detected by said magnetic field detectors.

21. A marine vessel having a podded electric motor, said podded electric motor comprising:
a plurality of magnetic transducers coupled to a control system, said transducers and control system adapted to mutually interoperate so as to mask a magnetic signature of said podded electric motor.

22. A marine vessel defined in claim 21 wherein said plurality of magnetic transducers comprises:
a plurality of magnetic sensors; and
a plurality of magnetic field generators.

23. A marine vessel as defined in claim 21 wherein said control system comprises a first computer processor and a second digital signal processor mutually coupled to produce an output signal, said output signal adapted to drive one of said transducers so as to attenuate a magnetic field produced by said podded electric motor.

24. A method of masking a magnetic signature of an electric motor, said method comprising the steps of:
predicting a respective location, magnitude and orientation of a first magnetic field vector of a first magnetic field produced by an first electric current within said motor, based in part on a magnitude of said first electric current of said motor;
supplying a second electric current to a magnetic field generator, said magnetic field generator adapted, on receipt of said electric current, to produce a second magnetic field having a second magnetic filed vector with a respective location and magnitude substantially equal to said location and magnitude of said first magnetic field vector, and having an orientation substantially opposite that of said first magnetic field vector.

25. An attenuation system for attenuating external electric fields, said system comprising:
- a sensor for sensing an external magnetic field about an electric machine;
- a processor for receiving a first input signal from said sensor and producing a second output signal;
- a phasor maker for receiving said second output signal and producing a third output signal having a respective first magnitude and phase; and
- a magnetic field transducer adapted to produce a magnetic field configured to attenuate at least a portion of said external magnetic field based on said third output signal.

26. The system as defined in claim 25 further comprising an amplifier adapted to receive said third output signal and transmit an amplified version thereof to said magnetic field transducer.

27. The system as defined in claim 26 wherein said processor further comprises a digital signal processor.

28. The system as defined in claim 26 wherein said processor further comprises a storage medium adapted to store a computer program, said computer program adapted to predict that external magnetic field at a particular time period.

29. A method of attenuating a magnetic field comprising:
- disposing a permanent magnet device including two rotatably connected magnetic structures in a magnetic field region;
- rotatably adjusting said connected magnetic structures to adjust a net magnetic field produced by said permanent magnet device; and
- attenuating a further magnetic field within said magnetic field region by combining said net magnetic field and said further magnetic field within said magnetic field region.

30. A method of attenuating a magnetic field as defined in claim 29 wherein said further magnetic field is a static magnetic field.

31. A method of attenuating a magnetic field as defined in claim 29 wherein said further magnetic field is a dynamic magnetic field when viewed with respect to an environment of said magnetic field region.

32. A magnetic field attenuating device comprising:
- first and second legs pivotingly coupled to one another;
- a first magnet coupled to said first leg;
- a second magnet coupled to said second leg, said first and second magnets disposed so as to produce respective magnetic fields, said respective magnetic fields being at least partially opposed to one another; and
- means for fixing said first and second legs within a magnetic field region.

33. A magnetic field attenuating device as defined in claim 32 further comprising a third and a fourth magnet coupled to said first and second legs respectively.

34. A magnetic field device as defined in claim 32 wherein said first leg is adapted to pivot in relation to said second leg, whereby a net magnetic field produced by said first and second magnets is adjusted.

* * * * *